(12) United States Patent (10) Patent No.: US 12,633,807 B2
Griesbach et al. (45) Date of Patent: May 19, 2026

(54) SHAFT GROUNDING RING AND METHOD FOR PRODUCTION THEREOF

(71) Applicants: ZF Friedrichshafen AG, Friedrichshafen (DE); KACO GmbH + Co. KG, Kirchardt (DE)

(72) Inventors: Michael Griesbach, Tettnang (DE); Bernhard Sauter, Tettnang (DE); Jochen Bantel, Kirchardt (DE); Dennis von Olnhausen, Kirchardt (DE)

(73) Assignees: ZF Friedrichshafen AG, Friedrichshafen (DE); KACO GMBH + CO. KG, Kirchardt (DE)

( * ) Notice: Subject to any disclaimer, the term of this patent is extended or adjusted under 35 U.S.C. 154(b) by 166 days.

(21) Appl. No.: 18/558,821

(22) PCT Filed: May 6, 2022

(86) PCT No.: PCT/EP2022/062230
§ 371 (c)(1),
(2) Date: Nov. 3, 2023

(87) PCT Pub. No.: WO2022/234057
PCT Pub. Date: Nov. 10, 2022

(65) Prior Publication Data
US 2024/0223051 A1 Jul. 4, 2024

(30) Foreign Application Priority Data

May 6, 2021 (DE) ..................... 10 2021 204 566.9

(51) Int. Cl.
*H02K 11/40* (2016.01)
*B60K 1/00* (2006.01)
(Continued)

(52) U.S. Cl.
CPC ................. *H02K 11/40* (2016.01); *B60K 1/00* (2013.01); *B60R 16/06* (2013.01); *H01R 39/025* (2013.01);
(Continued)

(58) Field of Classification Search
CPC .......... H02K 11/40; H02K 7/003; B60K 1/00; B60K 2001/001; B60R 16/06;
(Continued)

(56) References Cited

U.S. PATENT DOCUMENTS 5,062,194 A * 11/1991 Mercurio .............. B23P 19/084
29/451
11,070,114 B2 7/2021 Lenz et al.
(Continued)

FOREIGN PATENT DOCUMENTS

AT 211422 B 10/1960
DE 604627 A 10/1934
(Continued)

OTHER PUBLICATIONS

DE102019207241A1 English translation (Year: 2025).*
Annealing effect on the structure relaxation and mechanical properties of a Polytetrafluoroethylene film by RF-magnetron sputtering (Year: 2020).*
(Continued)

*Primary Examiner* — Christopher M Koehler
*Assistant Examiner* — Viswanathan Subramanian
(74) *Attorney, Agent, or Firm* — Dority & Manning, P.A.

(57) ABSTRACT
A method for producing a shaft grounding ring includes providing a shaft grounding ring having an annular main body and contact elements arranged on the main body. The contact elements are electrically conductive and plastic-based. The contact elements are configured to establish an electrically conductive sliding contact with a circumferential surface of a shaft or of a sleeve placed onto the shaft. The contact elements are elastically bendable such that the contact elements are configured to preload the electrically
(Continued)

conductive sliding contact. Additionally, the method includes thermally preconditioning the shaft grounding ring before use.

13 Claims, 5 Drawing Sheets

(51) Int. Cl.
| | |
|---|---|
| *B60R 16/06* | (2006.01) |
| *H01R 39/02* | (2006.01) |
| *H01R 43/14* | (2006.01) |

(52) U.S. Cl.
CPC ........ *H01R 43/14* (2013.01); *B60K 2001/001* (2013.01)

(58) Field of Classification Search
CPC ...... H01R 39/025; H01R 43/14; H01R 39/12; H01R 43/16
USPC ................................................ 310/71, 66, 72
See application file for complete search history.

(56) References Cited

U.S. PATENT DOCUMENTS

| | | | |
|---|---|---|---|
| 2012/0313479 A1 | 12/2012 | Bayer et al. | |
| 2013/0031774 A1 | 2/2013 | Aisenbrey | |
| 2016/0111941 A1* | 4/2016 | Sturm | H02K 11/40 |
| | | | 310/68 R |
| 2019/0109520 A1 | 4/2019 | van Bezooijen | |

FOREIGN PATENT DOCUMENTS

| | | |
|---|---|---|
| DE | 102010002536 | 9/2011 |
| DE | 102016010926 | 9/2017 |
| DE | 102017009360 | 4/2019 |
| DE | 102019207241 | 11/2020 |

OTHER PUBLICATIONS

International Search Report (English Translation) PCT/EP2022/062230, dated Aug. 31, 2022. (2 pages).
German Search Report DE 10 2021 204 566.9, dated Dec. 2, 2021. (12 pages).

* cited by examiner

VM  BAT        INV    G  GG   GW2  DW  AG

GW1    EM    RS        DW

SHAFT GROUNDING RING AND METHOD FOR PRODUCTION THEREOF

CROSS-REFERENCE TO RELATED APPLICATION

The present application is related and has right of priority to German Patent Application No. 10 2021 204 566.9 filed on May 6, 2021, and is a nationalization of PCT/EP2022/062230 filed in the European Patent Office on May 6, 2022, both of which are incorporated by reference in their entirety for all purposes.

FIELD OF THE INVENTION

The invention relates generally to a shaft grounding ring and to a method for producing such a shaft grounding ring. The invention further relates to an electric machine, an electric axle drive unit for a motor vehicle, and to a transmission for a motor vehicle having such a shaft grounding ring.

BACKGROUND

DE 10 2016 010 926 A1 describes a shaft grounding ring for dissipating induced voltages and electric charges from a shaft into a housing. For this purpose, the shaft grounding ring has at least one discharge element, which is made of an electrically conductive PTFE material and rests against the shaft via an elastically bent edge region with elastic deformation. As a result, an electrically conductive sliding contact is formed between the shaft and the discharge element. Due to electrical contacting of the discharge element onto the housing, an electrically conductive path is thus formed between the shaft and the housing.

Due to such a shaft grounding ring, an electrical potential equalization is achieved between a rotating shaft and a stationary housing. As a result, an uncontrolled potential equalization at the bearing points of the shaft is avoided. Furthermore, such a shaft grounding ring forms a return conducting path of interference currents coupled into the shaft to the source of interference and thus improves the electromagnetic compatibility of a system having such a source of interference. In order to also provide a suitable return conducting path for high-frequency interference currents, the shaft grounding ring must form a low-impedance return conducting path to the source of interference.

The impedance of the transition between a rotating shaft and a non-rotating shaft grounding ring is dependent on the preload force of the discharge element with respect to the shaft. A high preload force reduces the impedance but increases the rotational resistance of the shaft and results in increased wear of the contact elements. When a preload force is too low, the impedance increases considerably, however, and so a reliable return conducting path of high-frequency interference currents to the source of interference is not formed.

SUMMARY OF THE INVENTION

A first problem addressed by the invention is therefore that of providing a method for producing a shaft grounding ring, by which a reliable, low-impedance electrical connection is provided between a rotating shaft and a non-rotating shaft grounding ring. Another problem addressed by the invention is that of providing a shaft grounding ring which is suitable therefor.

The production method according to the invention is based on a shaft grounding ring which has an annular main body and multiple electrically conductive, plastic-based contact elements arranged on the main body. The contact elements form a non-rotating, electrically conductive interface of a sliding contact with a circumferential surface of a rotating shaft or with a circumferential surface of a sleeve which has been placed onto the shaft. The contact elements are elastically bendable and, due to their inherent bending elasticity, bring about a preloading of the sliding contact.

According to the invention, the shaft grounding ring is thermally preconditioned before it is used. Due to this method step, the plastic-based contact elements undergo thermal aging, and therefore a subsequent thermal load arising during the operation of the shaft grounding ring only negligibly affects the elasticity of the contact elements. Therefore, due to this method step, an elasticity of the contacts elements which is substantially constant over the period of operation of the shaft grounding ring is achieved, thereby ensuring a low-impedance electrical connection between the circumferential surface of the shaft or of the sleeve and the contact elements.

Preferably, the thermal preconditioning includes heating the shaft grounding ring to a defined temperature range for a defined time period. As a result, the elasticity of the contact elements is adjusted to a target value.

Preferably, the thermal preconditioning includes heating the shaft grounding ring to a temperature between 75 degrees Celsius and 180 degrees Celsius, such as to a temperature between 100 degrees Celsius and 140 degrees Celsius, such as to a temperature between 120 degrees Celsius and 140 degrees Celsius. The aforementioned temperature ranges have proven to be advantageous in trials.

Preferably, the thermal preconditioning includes heating the shaft grounding ring for a time period between 15 minutes and 120 minutes. This time period has proven to be advantageous in trials.

Preferably, the contact elements of the shaft grounding ring are preloaded during the thermal preconditioning, preferably onto the diameter that corresponds to the diameter of the shaft or to the circumferential surface of the sleeve. As a result, the thermal preconditioning acts on loaded contact elements, such that a memory effect arises. As a result, a particularly reproducible elasticity behavior is achieved during the subsequent operation of the shaft grounding ring.

The shaft grounding ring according to the invention for solving the further problem has an annular main body and multiple electrically conductive, plastic-based contact elements arranged on the main body. The contact elements form a non-rotating, electrically conductive interface of a sliding contact with a circumferential surface of a rotating shaft or with a circumferential surface of a sleeve which has been placed onto the shaft. The contact elements are elastically bendable and, due to their inherent bending elasticity, bring about a preloading of the sliding contact. The shaft grounding ring according to the invention is produced according to the above-described method.

The shaft grounding ring according to the invention is usable in a dry environment and in an oil chamber.

Preferably, the contact elements are formed from a thermally stable plastic, the contact elements being provided with an electrically conductive filler. Examples of thermally stable plastics are fluorothermoplastics, polyamides, or elastomers, such as, for example, fluorinated rubber. Graphite or copper particles are conceivable as electrically conductive fillers. It is particularly preferred when electrically conductive Polytetrafluoroethylene (PTFE) is used as a material for the contact elements.

The shaft grounding ring according to the invention is an integral part of an electric machine which includes a rotationally fixed stator and a rotatably mounted rotor. The rotor is coupled to a rotor shaft. The rotor shaft is grounded with respect to a housing of the electric machine by the shaft grounding ring according to the invention.

The shaft grounding ring according to the invention is an integral part of an electric axle drive unit for a motor vehicle. A shaft which is mounted in a housing of the electric axle drive unit is grounded with respect to the housing by the shaft grounding ring. The appropriately grounded shaft of the electric axle drive unit is, for example, a rotor shaft, a countershaft or at least one of the output shafts of the electric axle drive unit.

The shaft grounding ring according to the invention is an integral part of a transmission for a motor vehicle. A shaft which is mounted in a housing of the transmission, preferably an output shaft of the transmission, is grounded with respect to the housing by the shaft grounding ring according to the invention. The transmission includes an electric machine which drives the appropriately grounded transmission shaft.

BRIEF DESCRIPTION OF THE DRAWINGS

Exemplary embodiments of the invention are described in detail with reference to the figures, wherein.

DETAILED DESCRIPTION

Figure 1:
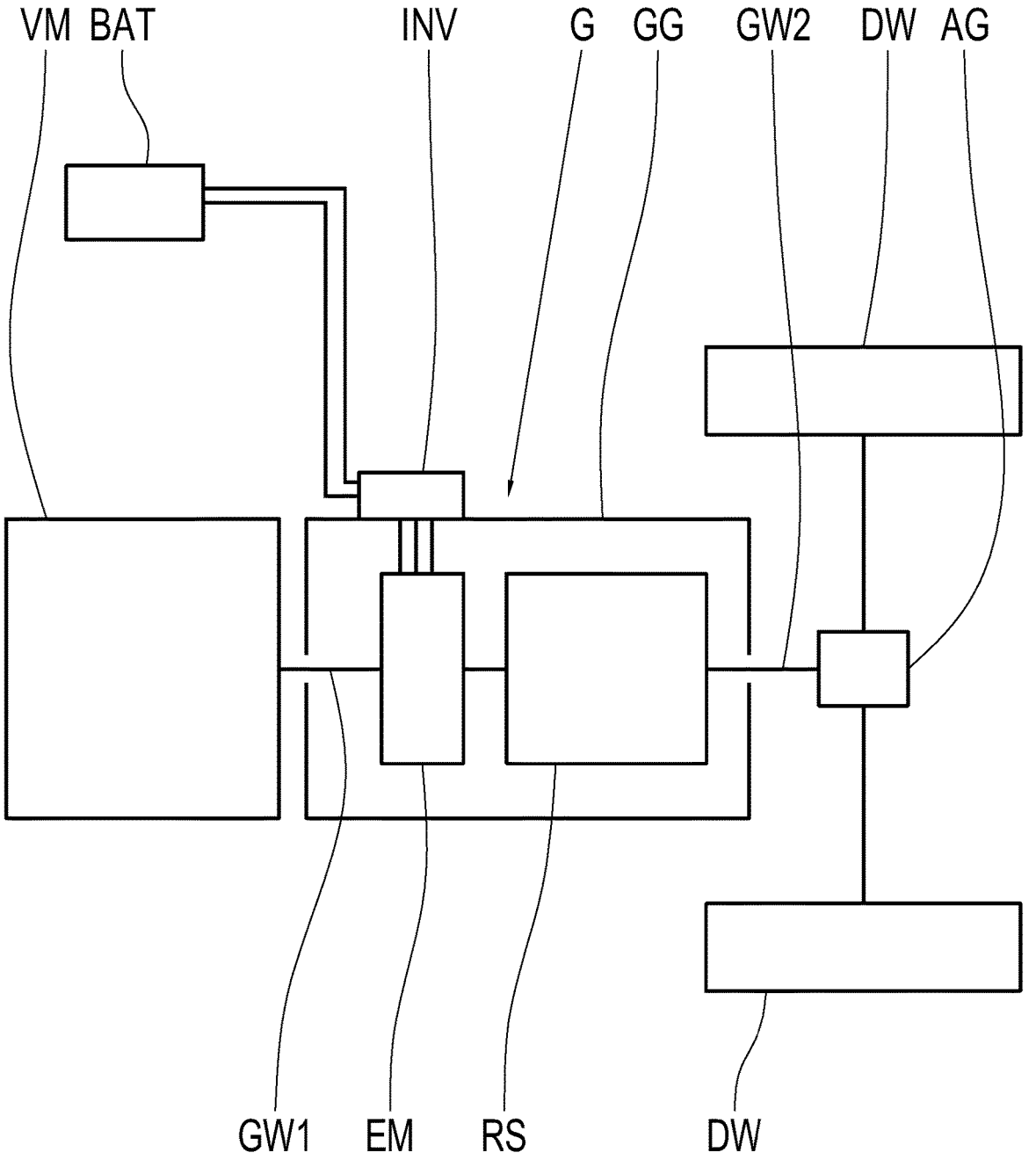
FIG. 1 and FIG. 2 each show a drive train of a motor vehicle.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 schematically shows a drive train for a motor vehicle. The drive train includes an internal combustion engine VM, the output of which is connected to an input shaft GW1 of a transmission G. An output shaft GW2 of the transmission G is connected to a differential gear AG. The differential gear AG distributes the power applied at the output shaft GW2 to driving wheels DW of the motor vehicle. The transmission G has a gear set RS, which, together with shift elements (not shown in FIG. 1), provide different transmission ratios between the input shaft GW1 and the output shaft GW2. The gear set RS is enclosed in a housing GG which also accommodates an electric machine EM which is connected to the input shaft GW1. The electric machine EM drives the input shaft GW1. A power converter INV is attached to the housing GG. The power converter INV is connected to the electric machine EM at one side and to a battery BAT at the other side. The power converter INV is utilized for converting the direct current of the battery BAT into an alternating current which is suitable for operating the electric machine EM and, for this purpose, includes several power semiconductors. The conversion between direct current and alternating current takes place by a pulse-like operation of the power semiconductors controlled by an open-loop system.

Figure 2:
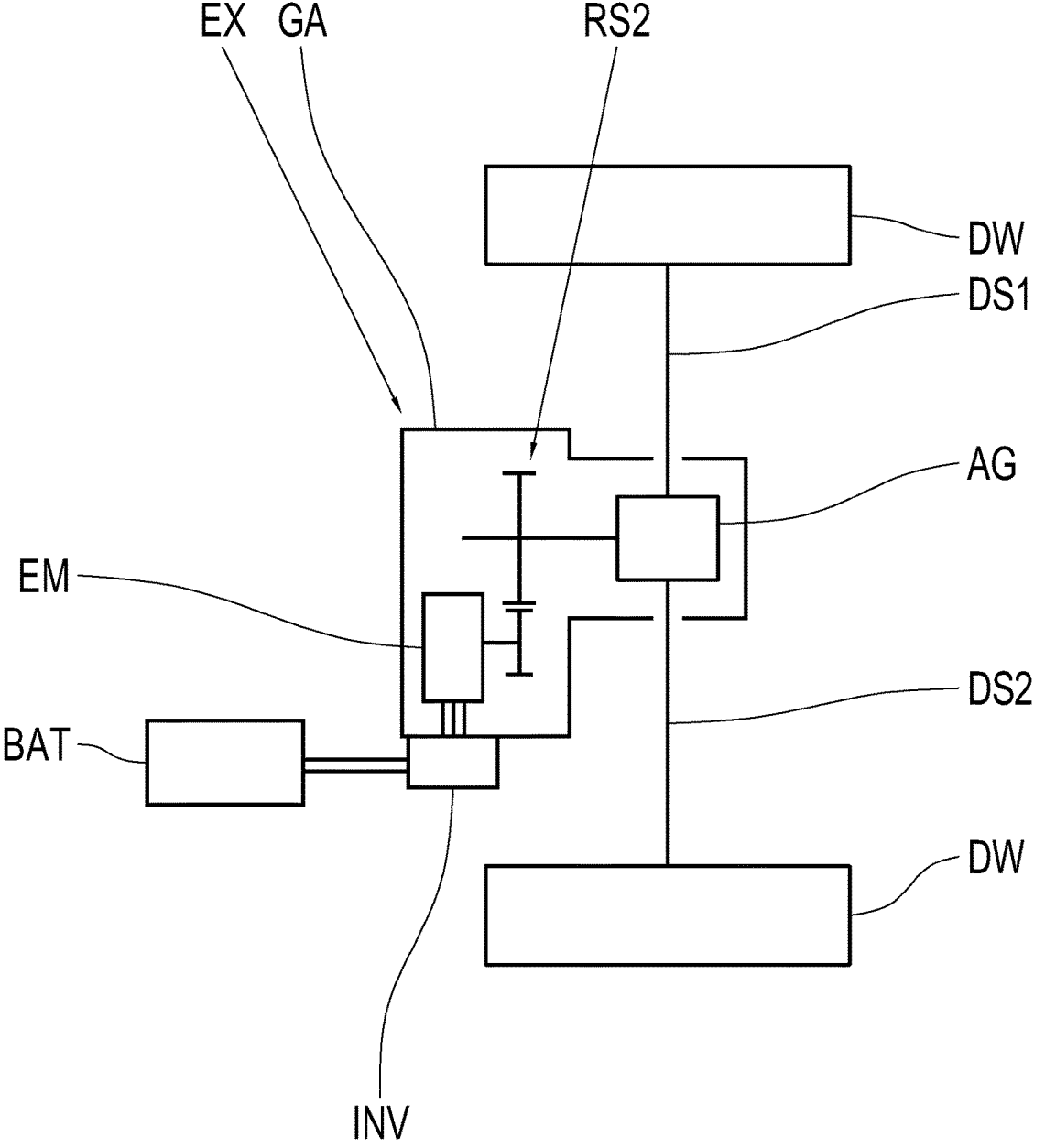

FIG. 2 schematically shows a drive train for a motor vehicle, which, in contrast to the embodiment shown in FIG. 1, is a purely electric drive train. The drive train includes an electric axle drive unit EX. The electric axle drive unit EX includes an electric machine EM, the power of which is transmitted via a reduction gear set RS2 and a differential gear AG onto driving wheels DW of a motor vehicle. Output shafts DS1, DS2 of the differential gear AG are connected to the driving wheels DW. The electric machine EM, the reduction gear set RS2, and the differential gear AG are enclosed in a housing GA. A power converter INV is attached to the housing GA. The power converter INV is connected to the electric machine EM at one side and to a battery BAT at the other side. The power converter INV is utilized for converting the direct current of the battery BAT into an alternating current which is suitable for operating the electric machine EM and, for this purpose, includes several power semiconductors. The conversion between direct current and alternating current takes place by a pulse-like operation of the power semiconductors controlled by an open-loop system.

The drive trains shown in FIG. 1 and FIG. 2 are to be considered merely as examples.

Due to the pulse-like operation of the power semiconductors, electromagnetic interference signals arise, which, for example, are coupled into the output shaft GW2 in the drive train according to FIG. 1 or into the output shafts DS1, DS2 in the drive train according to FIG. 2. Due to the mounting of the output shaft GW2 and of the output shafts DS1, DS2, which is not shown in FIG. 1 and FIG. 2, the output shaft GW2 and the output shafts DS1, DS2 are electrically insulated with respect to the housing GG and the housing GA, respectively, since the lube oil in the interior of the housing GG, GA has electrically insulating properties. Therefore, interference signals coupled into the output shaft GW2 or into the output shafts DS1, DS2 cannot flow on a short path into the housing GG or into the housing GA, respectively, the respective housing being connected to an electrical ground of the motor vehicle. Instead, the interference signals return to the electrical ground by electromagnetic emission, as the result of which, other electronic components of the motor vehicle are interfered with. The output shaft GW2 or the output shafts DS1, DS2 protruding from the housing GG or the housing GA, respectively, form an antenna which facilitates the electromagnetic emission of the interference signals.

Figure 3:
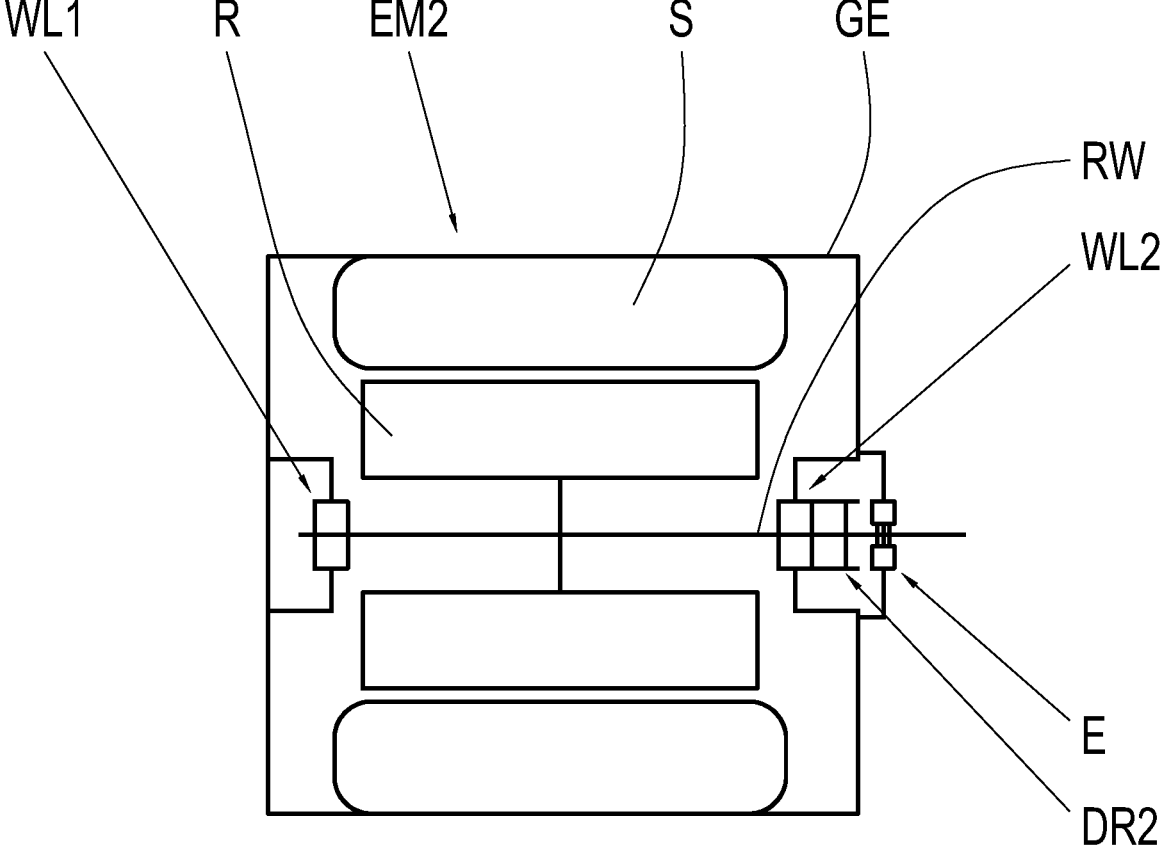
FIG. 3 shows an electric machine.

FIG. 3 shows a schematic view of an electric machine EM2. The electric machine EM2 has a housing GE which accommodates a stator S and a rotor R. The stator S is non-rotatably fixed in the housing GE. The rotor R is coupled to a rotor shaft RW, the rotor shaft RW being rotatably mounted via two roller bearings WL1, WL2 which are supported on the housing GE. One end of the rotor shaft RW projects out of the housing GE. A shaft grounding ring E is provided on an exposed section of the rotor shaft RW. A sealing ring DR2 is provided between the roller bearing WL2 and the shaft grounding ring E. The shaft grounding ring E establishes an electrically conductive contact between the housing GE and the rotor shaft RW. For this purpose, the shaft grounding ring E includes electrically conductive contact elements which slide on a surface of the rotor shaft RW. A potential difference between the housing GE and the rotor shaft E is reduced via the shaft grounding ring E. As a result, the roller bearings WL1, WL2 are protected against an uncontrolled potential equalization via the rolling elements of the roller bearings WL1, WL2.

Figure 4:
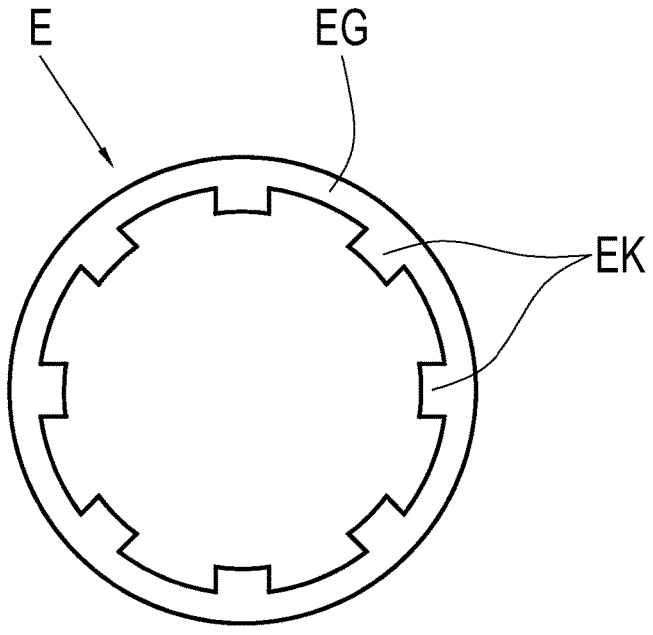
FIG. 4 shows a schematic view of a shaft grounding ring.

FIG. 4 shows a schematic view of a shaft grounding ring E. The shaft grounding ring E has an annular main body EG and multiple contact elements EK arranged thereon. As shown in FIG. 4, the main body EG is formed as a closed ring, but, in some instances, is formed as an open ring. The contact elements EK and the main body EG are electrically conductive. The contact elements EK and the main body EG are formed as one piece, as shown in FIG. 4. Alternatively, the contact elements EK are secured on the main body EG. The contact elements EK are formed from a thermally stable plastic, which is provided with an electrically conductive filler. Examples of thermally stable plastics are fluorothermoplastics, polyamides, or elastomers, such as, for example, fluorinated rubber. Graphite or copper particles are conceivable as electrically conductive fillers. It is particularly preferred when electrically conductive PTFE is used as a material for the contact elements EK.

Figures 5A, 5B:
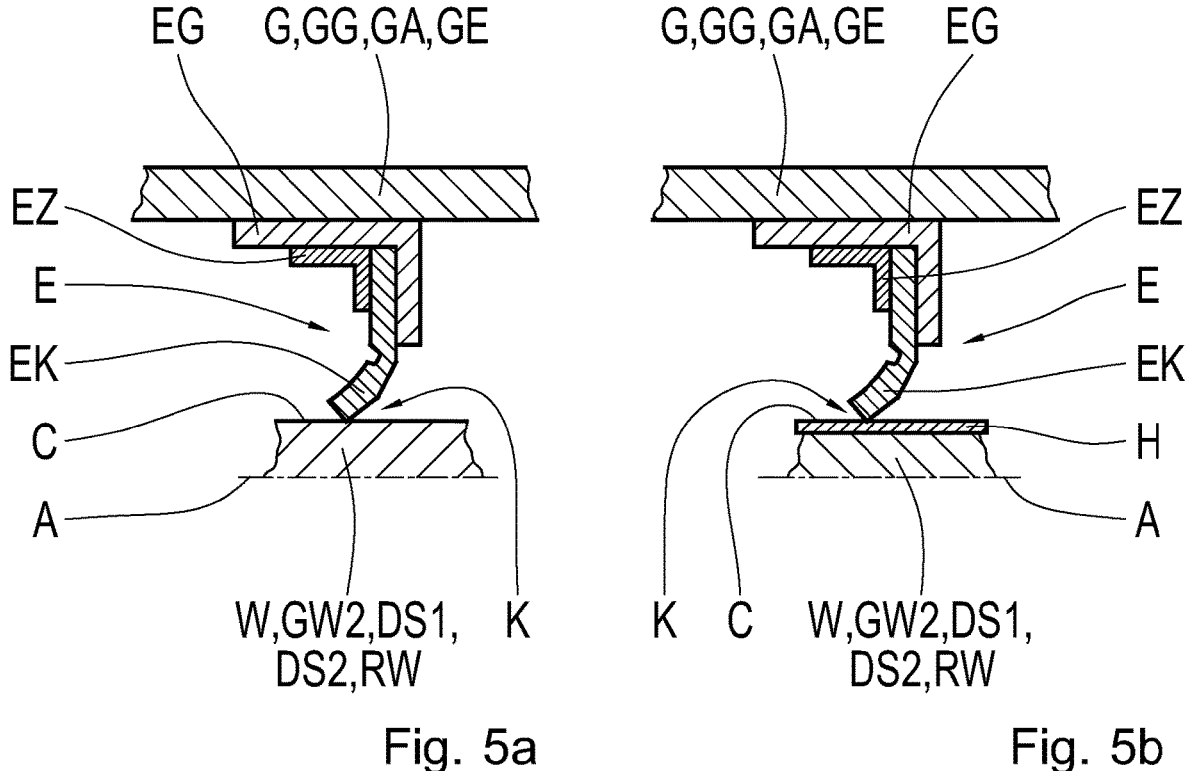
FIG. 5a and FIG. 5b each show a sectional view of the shaft grounding ring in the installed state.

FIG. 5a shows a schematic sectional view of the shaft grounding ring E in the installed state. The shaft grounding ring E is arranged radially between a shaft W and a housing G. The shaft W is mounted for rotation about an axis A. The shaft W shown in FIG. 5a could be, for example, the output shaft GW2 according to FIG. 1, one of the output shafts DS1, DS2 according to FIG. 2, or the rotor shaft RW according to FIG. 3. The housing G shown in FIG. 5a could be, for example, the housing GG according to FIG. 1, the housing GA according to FIG. 2, or the housing GE according to FIG. 3.

In the exemplary embodiment according to FIG. 5a, the shaft grounding ring E is formed as multiple pieces. The contact elements EK are clamped between the main body EG and a clamping ring EZ. The main body EG is mechanically and electrically conductively connected to the housing G. The radially inner end of the contact elements EK contacts a circumferential surface C of the shaft W. When the shaft W rotates, the contact elements EK slide along the circumferential surface C, thereby forming an electrically conductive, sliding contact K between the circumferential surface C and the contact elements EK. The sliding contact K is preloaded via the bending elasticity of the contact elements EK.

FIG. 5b shows a further schematic sectional view of the shaft grounding ring E in the installed state. In contrast to the schematic view according to FIG. 5a, the sliding contact K is now no longer present directly between the contact elements EK and the shaft W. Instead, the contact elements EK slide on the circumferential surface C of a sleeve H which is mechanically and electrically conductively connected to the shaft W.

Figures 6A, 6B:
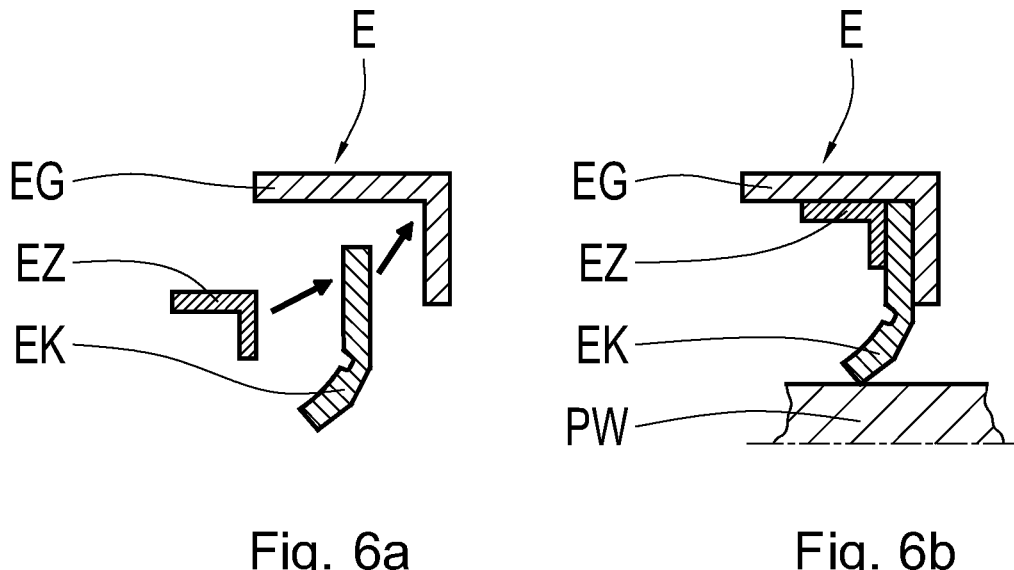
FIGS. 6a-6c each show an illustration of a method for producing the shaft grounding ring.
Figure 6C:
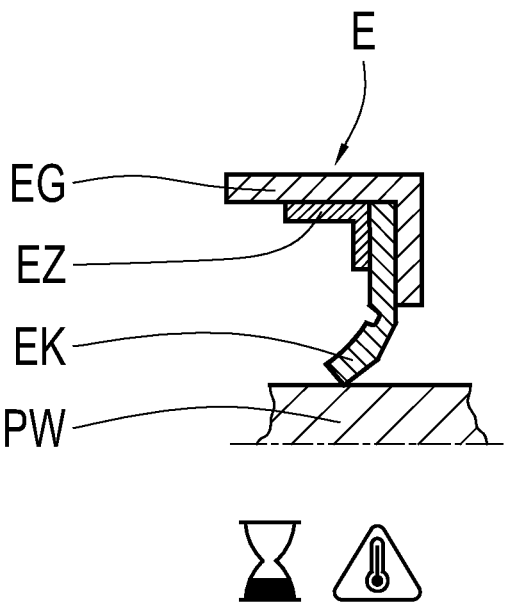

FIGS. 6a-6c show a method for producing the shaft grounding ring E. FIG. 6a shows the assembly of the multi-piece shaft grounding ring E. For this purpose, multiple contact elements EK are initially arranged on the main body EG. Thereafter, the contact elements EK are clamped to the main body EG by installing the clamping ring EZ. In FIG. 6b, the completely assembled shaft grounding ring E is installed on a test shaft PW. The diameter of the test shaft PW, against which the radially inner ends of the contact elements EK rest, substantially corresponds to the diameter of the shaft W or the sleeve H on which the shaft grounding ring E is to be subsequently utilized. Thereafter, the composite of shaft grounding ring E and test shaft W is heated to a defined temperature range for a defined time period. This is illustrated in FIG. 6c. Due to this method step, the plastic-based contact elements EK undergo thermal aging, and therefore a subsequent thermal load arising during the operation of the shaft grounding ring E only negligibly affects the bending elasticity of the contact elements EK. Therefore, a bending elasticity of the contact elements EK is achieved, which is substantially constant over the period of operation of the shaft grounding ring E, and so a low-impedance, electrical connection between the circumferential surface C of the shaft W or the sleeve H and the contact elements EK is ensured during the operation of the shaft grounding ring E.

Since the shaft grounding ring E is arranged on the test shaft PW during the heating, the thermal preconditioning acts on bending-loaded contact elements EK. This effectuates a memory effect on the geometry of the contact elements EK. As a result, a particularly reproducible elasticity behavior is achieved during the subsequent operation of the shaft grounding ring E.

The design of the shaft grounding ring E shown in FIG. 4, FIGS. 5a-5b and in FIGS. 6a-6c is to be considered merely as an example. The proportions selected in the schematic views are utilized in particular for the purpose of illustration, and are not to be considered to be full scale.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS

VM internal combustion engine
EX electric axle drive unit
G transmission
GW1 input shaft
GW2 output shaft
RS gear set
RS2 reduction gear set
EM electric machine
INV power converter
BAT battery
AG differential gear
DS1 output shaft
DS2 output shaft
DW driving wheel
GA housing
EM2 electric machine
S stator
R rotor
RW rotor shaft
WL1 bearing
WL2 bearing
DR2 sealing ring
GE housing
W shaft H sleeve
C circumferential surface
G housing
E shaft grounding ring
EG main body
EK contact element
EZ clamping ring
K sliding contact
PW test shaft

The invention claimed is:

1. A method for producing a shaft grounding ring (E), comprising:

providing a shaft grounding ring (E) having an annular main body (EG) and contact elements (EK) arranged on the main body (EG), the contact elements (EK) being electrically conductive and plastic-based, the contact elements (EK) being configured to establish an electrically conductive sliding contact (K) with a circumferential surface (C) of a shaft (W) or of a sleeve (H) placed onto the shaft (W), the contact elements (EK) being elastically bendable such that the contact elements (EK) are configured to preload the electrically conductive sliding contact (K); and thermally preconditioning the shaft grounding ring (E) such that the plastic-based contact elements (EK) undergo thermal aging before use, wherein thermally preconditioning the shaft grounding ring (E) comprises heating the shaft grounding ring to a defined temperature range from 75 degrees Celsius to 180 degrees Celsius for a time period between 15 minutes and 120 minutes, wherein thermally preconditioning the shaft grounding ring (E) comprises an inherent bending elasticity based preloading of the contact elements (EK) of the shaft grounding ring (E) during the thermal preconditioning, and wherein preloading the contact elements (EK) of the shaft grounding ring (E) during the thermal preconditioning comprises preloading the contact elements (EK) on a diameter of a test shaft (PW), the diameter of the test shaft (PW) corresponding to a diameter of the circumferential surface (C) of the shaft or of the sleeve.

2. A shaft grounding ring (E), wherein the shaft grounding ring (E) is produced according to the method of claim 1.

3. The method of claim 1, wherein the thermal aging of the plastic-based contact elements (EK) is configured such that a subsequent thermal load arising during use of the shaft grounding ring (E) only negligibly affects the elasticity of the contact elements (EK).

4. The method of claim 1, wherein thermally preconditioning the shaft grounding ring (E) comprises thermally preconditioning the shaft grounding ring (E) such that the plastic-based contact elements (EK) undergo thermal aging before use in establishing the electrically conductive sliding contact (K).

5. A shaft grounding ring (E), comprising:

an annular main body (EG) having contact elements (EK) arranged on the main body (EG), the contact elements (EK) being electrically conductive and plastic-based, the contact elements (EK) being configured to establish an electrically conductive sliding contact (K) with a circumferential surface (C) of a shaft (W) or of a sleeve (H) placed onto the shaft (W), the contact elements (EK) being elastically bendable such that the contact elements (EK) are configured to preload the electrically conductive sliding contact (K), wherein the shaft grounding ring (E) is configured to be thermally preconditioned such that the plastic-based contact elements (EK) are configured to be thermally aged before use, wherein thermally preconditioning the shaft grounding ring (E) comprises heating the shaft grounding ring to a defined temperature range from 75 degrees Celsius to 180 degrees Celsius for a time period between 15 minutes and 120 minutes, wherein thermally preconditioning the shaft grounding ring (E) comprises an inherent bending elasticity based preloading of the contact elements (EK) of the shaft grounding ring (E) during the thermal preconditioning, and wherein preloading the contact elements (EK) of the shaft grounding ring (E) during the thermal preconditioning comprises preloading the contact elements (EK) on a diameter of a test shaft (PW), the diameter of the test shaft (PW) corresponding to a diameter of the circumferential surface (C) of the shaft or of the sleeve.

6. The shaft grounding ring of claim 5, wherein the contact elements (EK) comprise a thermally stable plastic provided with at least one electrically conductive filler.

7. An electric machine (EM2), comprising:

a housing (GE);

a stator(S);

a rotor (R) coupled to a rotor shaft (RW), the rotor shaft (RW) being mounted in the housing (GE); and the shaft grounding ring (E) of claim 5, the shaft grounding ring (E) grounding the rotor shaft (RW) with respect to the housing (GE).

8. An electric axle drive unit (EX) for a motor vehicle, comprising:

a housing (GA);

a shaft (DS1, DS2) mounted in the housing (GA); and the shaft grounding ring (E) of claim 5, the shaft grounding ring (E) grounding the shaft (DS1, DS2) with respect to the housing (GA).

9. A transmission (G) for a motor vehicle, comprising:

a housing (GG);

a shaft (GW2) mounted in the housing (GG); and the shaft grounding ring (E) of claim 5, the shaft grounding ring (E) grounding the shaft (GW2) with respect to the housing (GG).

10. The transmission (G) of claim 9, wherein the shaft (GW2) is an output shaft of the transmission (G).

11. The transmission (G) of claim 9, further comprising an electric machine (EM), the shaft (GW2) being drivable by the electric machine (EM).

12. The shaft grounding ring of claim 5, wherein the contact elements (EK) being thermally aged only negligibly affects the elasticity of the contact elements (EK) during a subsequent thermal load arising during use of the shaft grounding ring (E).

13. The shaft grounding ring of claim 5, wherein the shaft grounding ring (E) is thermally preconditioned such that the plastic-based contact elements (EK) are thermally aged before use in establishing the electrically conductive sliding contact (K).

* * * * *